US011938969B2

(12) United States Patent
Botea et al.

(10) Patent No.: US 11,938,969 B2
(45) Date of Patent: Mar. 26, 2024

(54) INTELLIGENT DYNAMIC PARKING FOR AUTONOMOUS VEHICLES

(71) Applicant: INTERNATIONAL BUSINESS MACHINES CORPORATION, Armonk, NY (US)

(72) Inventors: Adi Botea, Dublin (IE); Beat Buesser, Ashtown (IE); Bei Chen, Blanchardstown (IE); Akihiro Kishimoto, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 16/198,935

(22) Filed: Nov. 23, 2018

(65) Prior Publication Data
US 2020/0167839 A1    May 28, 2020

(51) Int. Cl.
| | | |
|---|---|---|
| *G06Q 50/30* | (2012.01) | |
| *B60W 60/00* | (2020.01) | |
| *G06N 5/01* | (2023.01) | |
| *G06Q 30/0283* | (2023.01) | |

(52) U.S. Cl.
CPC .......... *B60W 60/0025* (2020.02); *G06N 5/01* (2023.01); *G06Q 30/0284* (2013.01); *G06Q 50/30* (2013.01); *B60W 2554/406* (2020.02); *G06Q 2240/00* (2013.01)

(58) Field of Classification Search
CPC .............. G06Q 30/0284; G06Q 50/30; G06Q 2240/00; B60W 30/06; G06N 5/003; G05D 1/0212; G05D 2201/0213
See application file for complete search history.

(56) References Cited

U.S. PATENT DOCUMENTS

| | | | |
|---|---|---|---|
| 9,567,007 B2 | 2/2017 | Cudak et al. | |
| 9,646,356 B1 | 5/2017 | Schwie et al. | |
| 2015/0346727 A1 | 12/2015 | Ramanujam | |
| 2017/0016732 A1* | 1/2017 | Ashton | G01C 21/343 |
| 2017/0138751 A1* | 5/2017 | Martyniv | G06Q 50/30 |
| 2017/0219364 A1* | 8/2017 | Lathrop | G01C 21/3453 |
| 2017/0329346 A1 | 11/2017 | Latotzki | |
| 2019/0120640 A1* | 4/2019 | Ho | G01C 21/3461 |
| 2019/0164418 A1* | 5/2019 | Neukart | G08G 1/0129 |
| 2020/0026279 A1* | 1/2020 | Rhodes | G01C 21/3476 |
| 2020/0026295 A1* | 1/2020 | Schimik | G06Q 10/109 |

FOREIGN PATENT DOCUMENTS

WO    WO-2018087551 A1 *    5/2018    ......... G01C 21/3446

OTHER PUBLICATIONS

Pearl et al., Studies in Semi-Admissible Heuristics, IEEE Transactions on Pattern Analysis and Machine Intelligence, vol. PAMI-4, No. 4, Jul. 1982 (Year: 1982).*
Judea Pearl, Some Recent Results in Heuristic Search Theory, IEEE Transactions on Pattern Analysis and Machine Intelligence, vol. PAMI-6, No. 1, Jan. 1984 (Year: 1984).*
Liu et al., A*Prune: An Algorithm for Finding K Shortest Paths Subject to Multiple Constraints, IEEE Infocom 2001 (Year: 2001).*

* cited by examiner

*Primary Examiner* — Rupangini Singh
(74) *Attorney, Agent, or Firm* — James L. Olsen

(57) ABSTRACT

Embodiments for intelligent dynamic parking for autonomous vehicles by a processor. A dynamic parking plan may be determined for an autonomous vehicle to travel from a selected location and returning to the selected location within a selected time window according to a transportation network and one or more a variable parking functions in lieu of waiting at the selected location.

18 Claims, 6 Drawing Sheets

US 11,938,969 B2

INTELLIGENT DYNAMIC PARKING FOR AUTONOMOUS VEHICLES

BACKGROUND OF THE INVENTION

Field of the Invention

The present invention relates in general to computing systems, and more particularly to, various embodiments for intelligent dynamic parking for autonomous vehicles by a processor.

Description of the Related Art

Vehicles of every kind, size, and energy consumption are prevalent in every aspect of today's society, as people are more mobile today than at any time in recorded history. Attendant with the proliferation of vehicles have been certain limitations associated with navigating a vehicle through urban settings and locating an available parking area at or near a desired destination. For example, drivers of automotive vehicles in urban settings frequently waste a lot of time driving around a parking lot in search of an open or optimal parking lot location also referred to as a parking spot or parking area. Searching for an open or optimal parking area location only compounds the navigation task of the vehicle or operator of the vehicle.

SUMMARY OF THE INVENTION

Various embodiments for intelligent dynamic park for autonomous vehicles by a processor, are provided. In one embodiment, by way of example only, a method for dynamic parking for autonomous vehicles by a processor is provided. A dynamic parking plan may be determined for an autonomous vehicle to travel from a selected location and returning to the selected location within a selected time window according to a transportation network and one or more a variable parking functions in lieu of waiting at the selected location.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
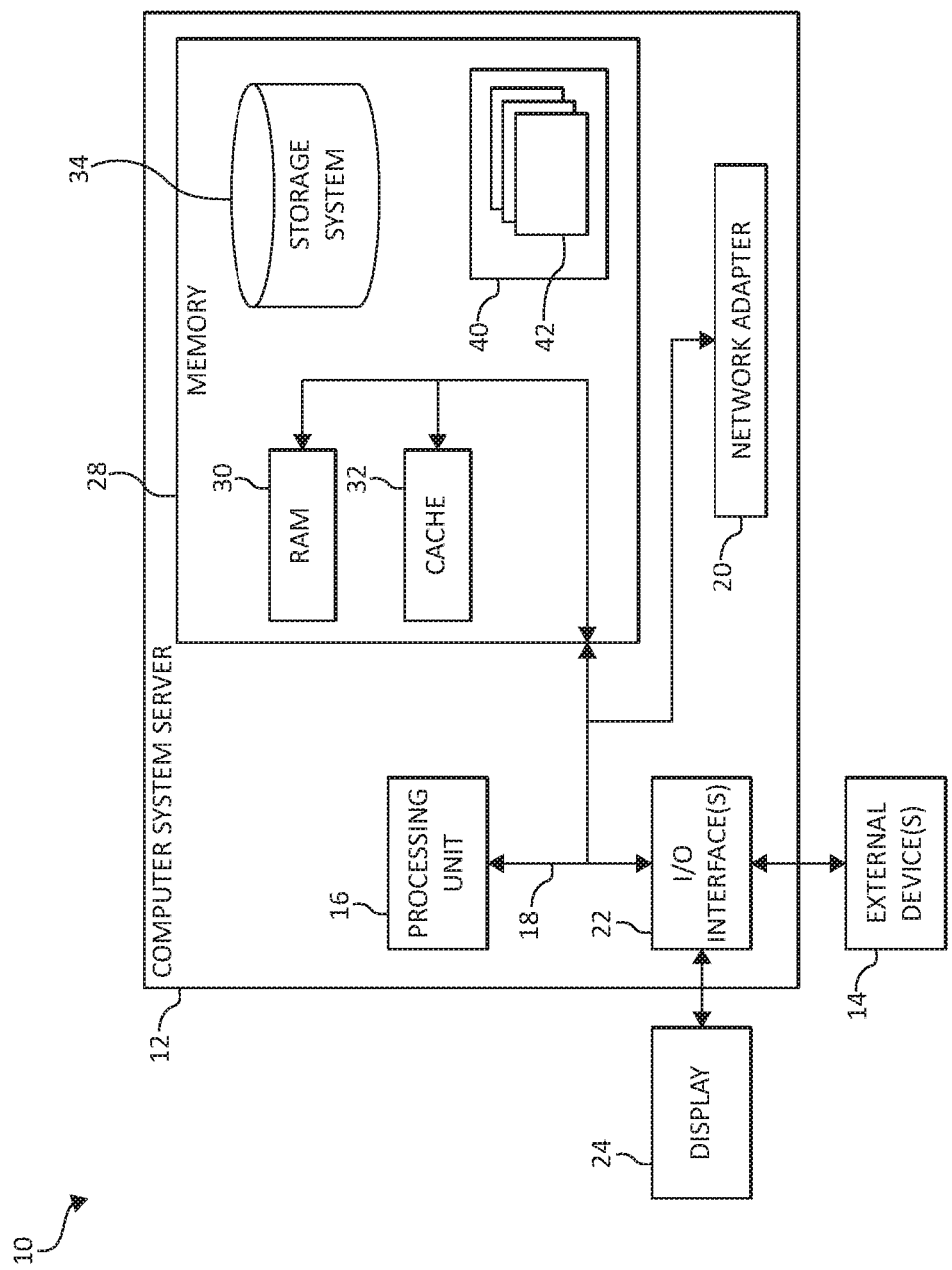
FIG. 1 is a block diagram depicting an exemplary computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems, particularly within the cloud computing environment, in a variety of settings provide various beneficial uses to a user. Various IoT appliances may be used for personal use, such as travel, while also using the IoT appliances within various types of vehicles or navigation systems for travel. For example, various IoT computing devices may be employed in self-driving vehicles (SDVs). SDVs are vehicles that are able to autonomously drive themselves through private and/or public spaces. Autonomous vehicles (e.g., SDVs) offer the prospect of eliminating the dangers of erratic driving or accidents. Specifically, the lack of human error while driving may result in a safer journey. Sensors in the autonomous vehicles also allow for vehicles to pack closer together, allowing for more vehicles to be on the road while shortening traffic times. Fully autonomous SDVs may even eliminate the need to pass a driving test and/or gain a driving license.

In light of such computing and technological advancements, a common problem to operators of motor vehicles (e.g., "drivers") and/or an autonomous vehicle is the difficulty in identifying and locating a parking area (e.g., a parking spot or "parking stall") near a location of a target destination. For example, parking in a populated area may be costly, time consuming, and even impossible. To alleviate locating a parking location for a vehicle, some parking lot facilities have provided an indication in a parking garage or parking lot that there are parking spaces available. However, the designated parking spot locations are typically not provided to the vehicle driver. Furthermore, when no indication of available parking locations/spots are identified by any type of signage, drivers often find themselves wasting time driving around a parking lot trying to find an available parking spot. Even worse, some drivers park in travel lanes or restricted areas of a parking lot areas such as, for example, when anticipating a vehicle to exit a parking stall only to later find the driver's vehicle is either too large for the desired parking spot or the vehicle never exits the parking spot. Attempts to locate and park in a desired location may even require more time than the actual performance of the activity (e.g., shopping) at the location.

Thus, the mechanisms of the present invention provide a cognitive system for intelligent and dynamic parking for autonomous vehicles by a processor. A dynamic parking plan may be determined for an autonomous vehicle to travel from a selected location and returning to the selected location within a selected time window according to a transportation network and one or more a variable parking functions in lieu of waiting at the selected location.

In one aspect, one or more IoT devices may be used to inform a user or vehicle of any incidents which may affect travel time/travel safety/travel comfort for parking at a determined destination and/or be used to assist with planning for dynamic parking. Such information may be provided to a user during navigation along a route via an in-car navigation device such as, for example, by a personal navigation device ("PND"), an integrated device in a vehicle, and/or may be provided as an input to an Advanced Driver Assistance System ("ADAS").

In one aspect, the present invention provides a cognitive system using artificial intelligence ("AI") that enables an autonomous car to drive around while a user/driver is performing an activity external to the vehicle (e.g., shopping, attending a meeting, etc.), when no parking is available or too costly (e.g., financial cost, time cost, etc.). A policy (e.g., a dynamic parking policy) may be determined for an autonomous car driving from point "A" and then returning to back to point "A" after a given time. For example, a dynamic parking plan policy may indicate to the autonomous vehicle to drive around in a selected area (e.g., a neighborhood), avoiding traffic-congested roads, and returning back to the initial starting point at a designated time.

For example, the cognitive system enables an autonomous vehicle to travel from a starting point and return to the pick-up location (e.g., the same starting point): 1) at a fixed time; and/or 2) upon request, with a guarantee that the autonomous vehicle is never more than M minutes (e.g., a defined time period) away from the pick-up location, where "M" is a positive integer or defined value; and/or 3) the cognitive system detects that a user/driver is ready for being picked up at the pick-up location.

In one aspect, the cognitive system/network may include crowd source data, where one or more applications rely on traffic sources such as public sector and private entity sources, which can provide updated or real-time traffic data. For example, the cognitive system may include a mobile application (e.g., a global positioning satellite "GPS" navigation application) that may automatically collect traffic data and road condition information from users and/or other vehicles as they drive. The cognitive system/network may rely on crowd sourced data to present updated traffic information to users of the application. Additionally, the cognitive system/network may consider traditional traffic sources when presenting traffic information to its users.

Also, a vehicle may be an SDV and/or contain computing technology to enable both autonomous driving modes (e.g., SDV) and manual driving modes. In one aspect, the vehicle (e.g., autonomous vehicle) computing system may include the mobile application (e.g., a global positioning satellite "GPS" navigation application). In one aspect, one or more cameras and sensors may be placed or located at one or more locations of a vehicle (e.g., dashboard, steering wheel, gas pedal, front or rear bumpers, wheel-well, or other locations suitable for mounting or securing a camera). The operator of a vehicle may be made aware of the intelligent transition between autonomous and manual driving modes. Also, the vehicle may advise a centralized server or "HUB" of a cognitive system via an interactive GUI or other communication means (e.g., a voice activated detection system of a vehicle in communication with the vehicular collaboration system) of the generated dynamic parking plan.

It should be noted that as used herein, "vehicle" may include one or more variety types of modes of transportation. For example, vehicle may include automobiles (e.g., car, sport utility vehicle "SUV", trucks, etc.), off-road vehicles (e.g., all-terrain vehicles "ATV") bicycles, motorcycles, trains, subways, ships, boat, aircrafts, watercrafts, sailcrafts, hovercrafts, golf carts, and/or other types of transportation or movable objects. In an additional aspect, vehicle may include one or more types of transportation or movable objects that require a license and/or registration (e.g., a driver's license issued by a governmental or regulatory agency) in order to operate and move about a roadway, highway, railways, and/or other means for operating the one or more types of transportation or movable objects.

It should be noted as described herein, the term "cognitive" (or "cognition") may be relating to, being, or involving conscious intellectual activity such as, for example, thinking, reasoning, or remembering, that may be performed using a machine learning. In an additional aspect, cognitive or "cognition may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of behavior, leading to a "learning" of one or more events, operations, or processes. Thus, the cognitive model may, over time, develop semantic labels to apply to observed behavior and use a knowledge domain or ontology to store the learned observed behavior. In one embodiment, the system provides for progressive levels of complexity in what may be learned from the one or more events, operations, or processes.

In additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Network adapter may communicate with a hub server or a cloud via wireless, optical fibre, or copper fibre. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
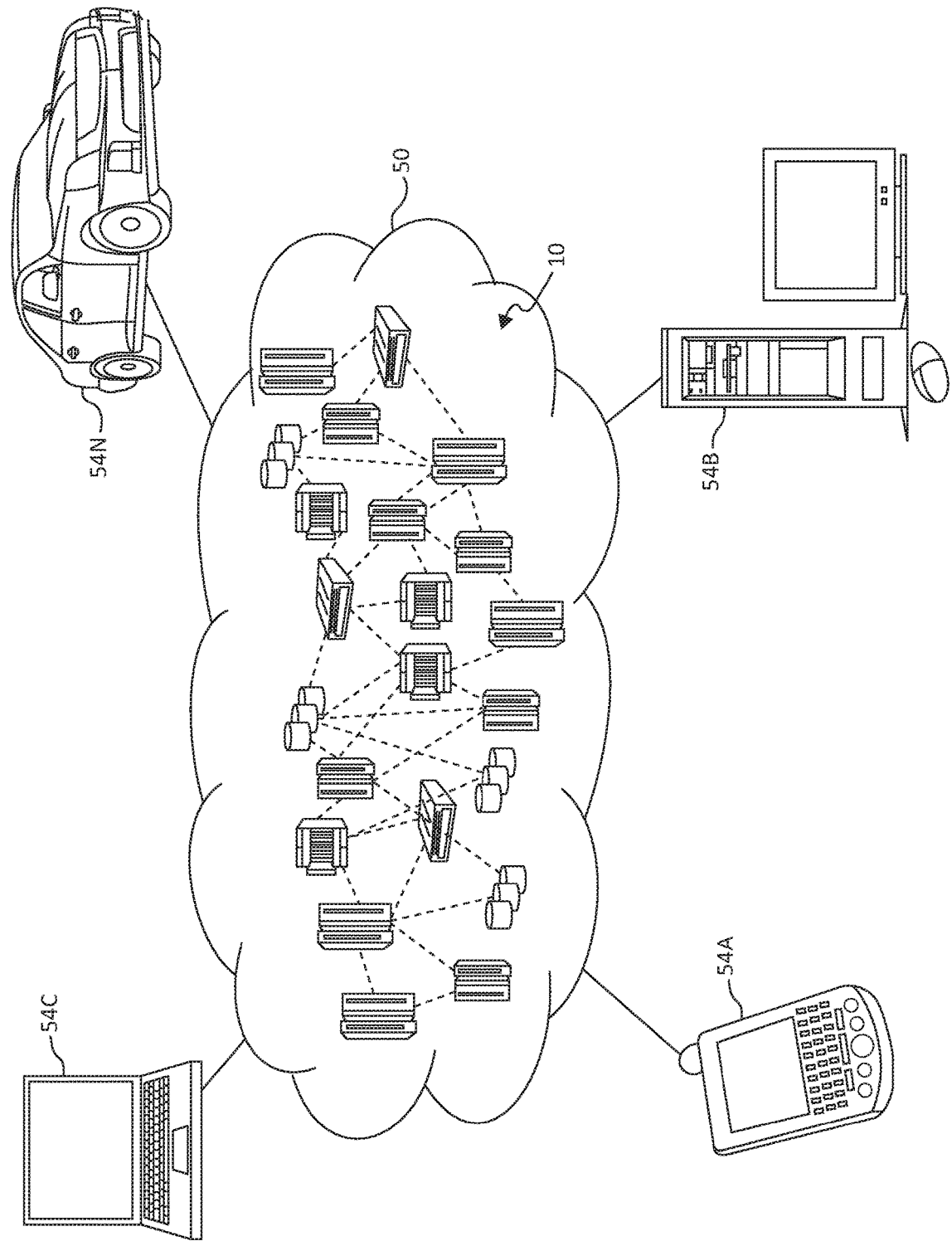
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser provided by a service provider).

Figure 3:
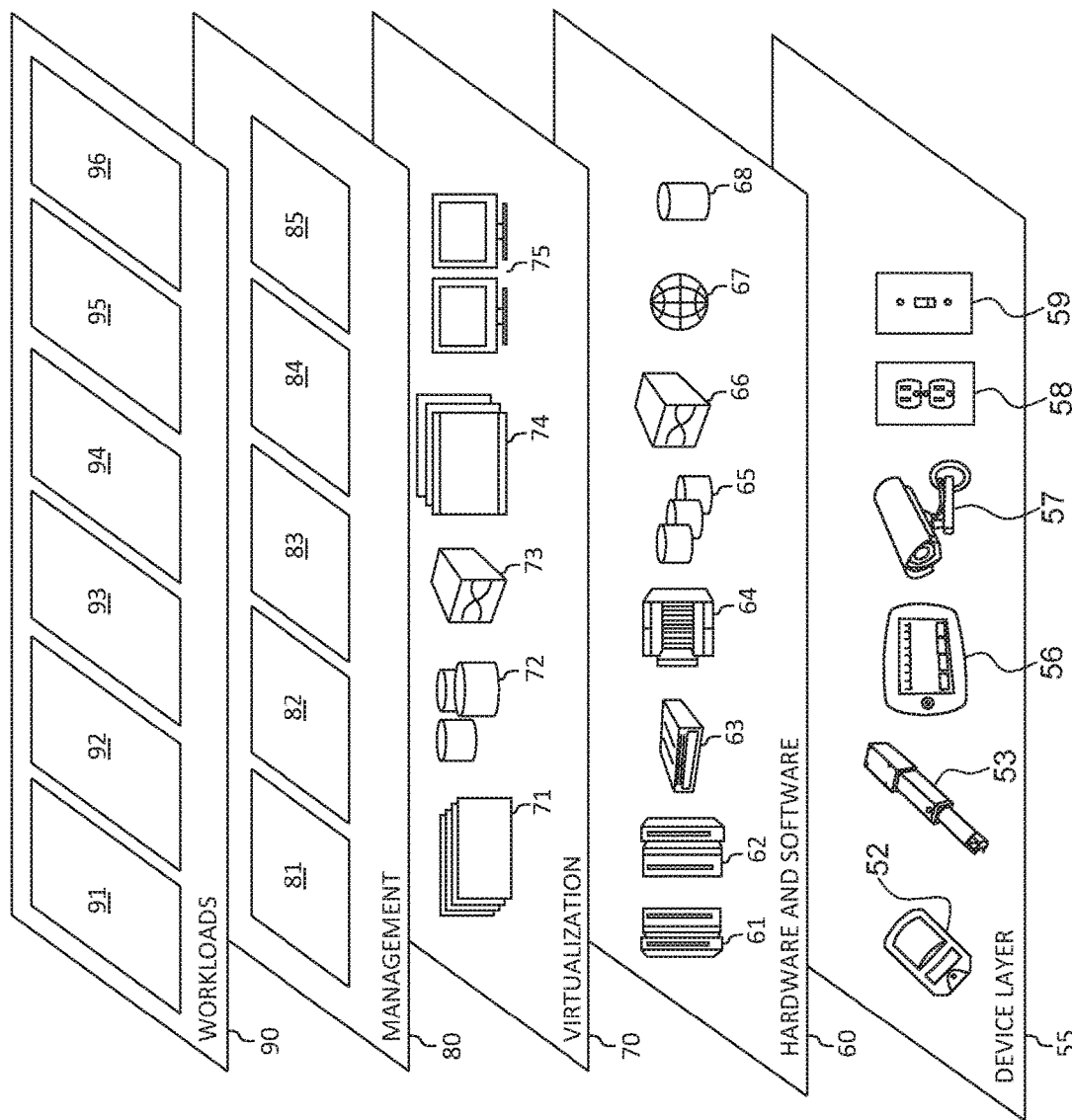
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "Internet of Things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture, such as PowerPC, based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for intelligent planning for dynamic parking. In addition, workloads and functions 96 for intelligent planning for dynamic parking may include such operations as data analysis (including data collection and processing from various environmental sensors), collaborative data analysis, and predictive data analytics functions. One of ordinary skill in the art will appreciate that the intelligent transition between autonomous and manual driving mode workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for intelligent and dynamic parking for autonomous vehicles using one or more processors. A cognitive system may use as input 1) a graph representing road map/transportation network, 2) time (e.g., which may be discretized), and 3) at least three types of costs: a) a congestion cost defined for edges of the graph, b) parking cost defined for each node of the graph, and b) an amount of time to travel defined for the edges, 4) a defined arrival time "T" for returning to the start point, and/or 5) one or more actions that occur one or more nodes (e.g., N number of nodes).

In one aspect, the congestion cost, the parking costs, and the time cost may each be variable and change over time (e.g., a congestion cost, parking costs, and/or the travel time costs may be higher during a traffic rush hour period). Also, the one or more actions that occur one or more nodes may include, for example traveling/driving across an outgoing edge, in which the congestion cost is assumed (e.g., pay the congestion cost where the time increases by an amount equal to the traversal cost of that edge) and/or waiting at node N for one time step (if parking is allowed/possible there), in which the parking cost is assumed (e.g., paid). It should be noted that in relation to "outgoing edge," assume that the current location of a vehicle is an intersection on the road map. Outgoing edges refer to street segments adjacent to the current location that can be used to leave the intersection. More specifically, two-way street segments adjacent to that intersection qualify as outgoing edges. One-way street segments adjacent to that intersection may also qualify as outgoing edges, with the one-way direction set in such a way that can be used that one-way street to leave the current intersection.

Also, the congestion cost associated with a road segment and a time of the day is may be a number given as input. The congestion cost for a given segment at a given time may not be identical to the traversal time cost. The two costs (e.g., congestions cost and traversal time cost) can be correlated, but not necessarily identical. The reason for the correlation is that higher congestion typically means a longer traversal time. The reason for different costs may be that the two road segment with zero congestion can have different speed limits, and thus different traversal times). The congestion cost of a journey (e.g., an entire trip) may be the sum of the congestion costs of all the trip segments. Trips with high congestion costs may be discouraged. "Paying" the congestion cost refers exactly to the fact that a user prefers trips with a smaller congestion cost.

Figure 4:
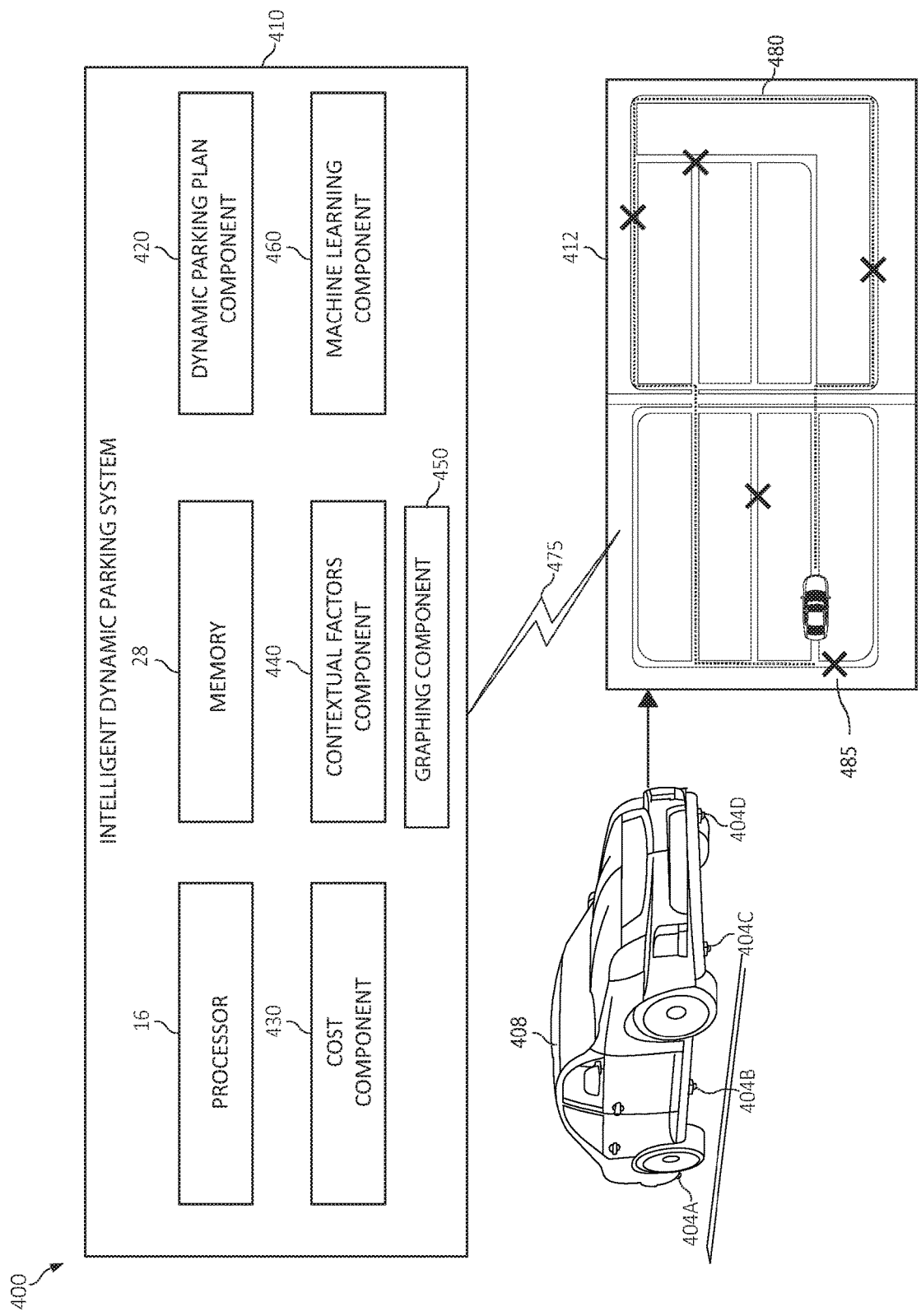
FIG. 4 is an additional diagram depicting various hardware and computing components functioning in accordance with aspects of the present invention.

Turning to FIG. 4, a block diagram of various functionality for a cognitive system 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

For example, computer system/server 12 of FIG. 1 may be included in FIG. 4 and may be connected to other computing nodes (such as computer systems of vehicles) over a distributed computing network, where additional data collection, processing, analytics, and other functionality may be realized. The computer system/server 12 of FIG. 1 (e.g., a cognitive computer system), may include an intelligent dynamic parking system 410. In one embodiment, the intelligent dynamic parking system 410 may be in communication via network or communication link 475 with one or more vehicles such as, for example, vehicle 408. In one aspect, vehicle 408 may be an autonomous vehicle and/or have functionality to operation in autonomous driving mode and manual driving mode.

In one aspect, the computer system/server 12 may provide virtualized computing services (i.e., virtualized computing, virtualized storage, virtualized networking, etc.). More specifically, the computer system/server 12 may provide virtualized computing, virtualized storage, virtualized networking and other virtualized services that are executing on a hardware substrate.

In one aspect, the intelligent dynamic parking system 410 may be an independent computing service provided by one or more computing systems and servers (e.g., a "HUB") for illustrative convenience but may be included in one or more components, modules, services, applications, and/or functions of FIGS. 1-3) and external to the vehicles 408. In an additional embodiment, the intelligent dynamic parking system 410 may be located and installed within one or more vehicles such as, for example, vehicle 408.

Vehicle 408 may be driven by an occupant and/or by using self-driving technology (e.g., autopilot). Vehicle 408 may have installed thereon one or more internet of things (IoT) devices 404A-D, such as cameras and sensor based devices to gather data in relation to each of the occupants of the vehicle 408. That is, a variety of IoT devices 404A-D, such as cameras (including UV/thermal cameras and the like capable of capturing a field of view "FOV" outside, inside and around each occupant of a vehicle) and sensor devices (e.g., audio input devices, recording devices, additional cameras, temperature sensors, atmospheric sensors, biological sensors, steering wheel sensor, gas pedal/brake sensors or other sensor devices to record or broadcast a wide variety of data) may be installed in and/or around the vehicle 408. In an additional aspect, the IoT devices 404A-D (e.g., cameras and sensor based devices) may be used collectively and/or individually to record, track, and/or monitor a position of a vehicle in three-dimensional space. Vehicle 408 may also receive data from one or more external sources and/or IoT devices (e.g., cellular telephone 54A, desktop computer 54B, laptop computer 54C, and/or automobile computer system 54N of FIG. 2 or other IoT devices such as a smart watch).

Also, the intelligent dynamic parking system 410 may incorporate processing unit 16 ("processor") and memory 28 of FIG. 1, for example, to perform various computational, data processing and other functionality in accordance with various aspects of the present invention. The intelligent dynamic parking system 410 may also include a dynamic parking plan component 420, cost component 430, contextual factors component 440, a graphing component 450, and a machine learning component 460, each of which may be controlled and in communication with processing unit 16 and memory 28.

The dynamic parking plan component 420 determine a dynamic parking plan for an autonomous vehicle to travel from a selected location and returning to the selected location within a selected time window according to a transportation network and one or more a variable parking functions in lieu of waiting at the selected location. The dynamic parking plan component 420 may determine one or more actions to perform within the dynamic plan. The one or more actions may include traversing one or more edges in a transportation network graph of the transportation network, waiting at selected alternative locations, or a combination thereof. The dynamic parking plan component 420 may restrict the autonomous vehicle to be within at least a defined amount of time from the selected location. The dynamic parking plan component 420 may also dynamically adjust the dynamic parking plan according to one or more contextual factors.

The cost component 430 may define one or more variable parking functions according to a congestion cost function that allows to minimize a total congestion cost by autonomous vehicle, and/or define the one or more a variable parking functions according to a travel time function that determines an amount of time for the autonomous vehicle to travel.

To assist the dynamic parking plan component 420 to determine a dynamic parking plan, the graphing component 450 may dynamically build a graph 480 of the transportation network having one or more nodes and one or more edges (as illustrated with an "X" in graph 480 of FIG. 4). The graphing component 450, in association with the dynamic parking plan component 420, may perform a heuristic search according to the congestion cost function, the travel time function, or a combination thereof.

The graphing component 450 determines one or more edges ("X") for the vehicle 408 to traverse according to the heuristic search for traveling from the selected location and returning to the selected location.

For example, the Heuristic search may be performed according to one or more operations. The Heuristic search may be performed to reach a "destination A" (e.g., location 485 of graph 480) at time T while minimizing a sum of congestion cost and parking cost. As secondary criteria for the Heuristic search, other costs may be minimized such as, for example, fuel consumption, pollution, etc.

A search space may be built where a state is equal to a location at a node and a timestamp (e.g., node, timestep which may be equal to (n, t). Thus, two graphs may be involved; a search space graph and/or a roadmap (e.g., transportation network). Thus, the state of a pair of two objects may be the location and the time and how the states are connected by edges in the search graph are determined by the roadmap and timestep. The heuristic search searches for a solution which consists of a sequence of vehicle movements to reach the destination from the current location at timestamp (t).

The search may include one or more transitions that equal to traversing one or more edges, and waiting in designated location. The Heuristic search may run A* search with an admissible heuristic. The admissible heuristic may be based on relaxation (e.g., a relaxed version of the road map may be built). It should be noted that "relaxation) is in setting the cost of transitions. A Dijkstra operation may be performed backwards from A. A pruning operation may be performed b by comparing T-t compared to an admissible estimation of the travel time from location "N" to location "A". In one aspect, the Heuristic search algorithms, including A*, may require a heuristic function (h). For every state (s) in a search space, h(s) is an estimation of the cost from s to any goal state. By definition, the heuristic function is admissible if the heuristic function never overestimates the actual cost. For example, assume that the optimal travel time from point A to point B is 30 minutes. A heuristic estimation of 25 minutes is admissible, but an estimation of 35 minutes is not admissible. Also, if the A* algorithm uses an admissible heuristic, then A* computes optimal solutions. In one aspect, the heuristic function may be built based on one or more relaxing assumptions.

For example, assume it is desired to precompute an admissible estimation of the travel time from point A to point B, regardless of the time of the day, congestion level, accidents, or other factors. For the purpose of computing the heuristic estimation of the travel time, a relaxing assumption may be made that the conditions will be ideal (e.g., no congestion, etc.). Then, the travel time may be determined/computed under those ideal conditions (e.g., under the relaxed assumptions), which gives as an admissible estimation. Furthermore, running Dijkstra's algorithm backwards from A, under the ideal conditions mentioned (no congestion, etc.) may provide an admissible estimation of the cost from every node in the roadmap to A. For example, assume a person departs from point A and must return to point A in exactly 30 minutes, to pick the passenger up. As the search space is explored to identify/find a plan/policy for this task, at some point a route starting with point A to point B to point C to point N (e.g., "A→B→C→N") may be explored and/or identified. Traveling from point A to point N along that route takes 20 minutes. Returning from point N to point A on any route takes at least 15 minutes, according to the admissible heuristic estimation h(N)=15. At this point, it may already be known that there are no beneficial policies that can start with A→B→C→N, because the total travel time is at least 35 minutes, which is more than our desired value (30 minutes). Thus, the present invention may prune away (i.e., don't explore further) the itinerary A→B→C→N. It should also be known that "T" is a total duration of a beneficial/good policy (e.g. 30 minutes in the above example) while "t" is a travel time from point A to point N (e.g. 20 minutes in the above example). Thus, it may be observed that the person needs to return from point N to point A in exactly 10 minutes, whereas the heuristic h(N) indicates that the person needs at least 15 minutes, which may be a reason to infer that the sequence A→B→C→N is not a beneficial/good sequence and may be disregarded.

The dynamic parking plan component 420 may also determine an appropriate transition time required for each of the one or more entities for one or more types of vehicles to complete the customized transition plan. For example, an experienced driver may require less time for completing a customized transition plan for a particular vehicle as compared to less experienced drivers. Thus, using one or more IoT devices or computing systems, the vehicle 408 may broadcast, communicate, and/or alert/notify a driver in relation to the actions of the driver compared to the required actions of the customized transition plan.

It should be noted that the dynamic parking plan component 420 may use the various IoT devices to engage in an interactive dialog using one or more communication systems of the vehicle 408 to communicate with each occupant and/or driver of the vehicle 408 and/or one or more users external to the vehicle.

The contextual factors component 440 may define the one or more identified contextual factors to include weather conditions, road conditions, autonomous vehicle manufacturer conditions, a level of traffic congestion within a selected distance from the vehicle, or other user defined contextual factors. The contextual factors may also include, but are not limited to, a user profile (e.g., user likes/dislikes relating to parking areas, historical data relating to driving patterns and/or parking patterns and preferences, travel patterns, favorite target destinations, frequently visited parking areas, data relating types of vehicles the user may drive or own and/or shapes, sizes, makes, models, or dimensions of the types of vehicles the user may drive), lane markings (including the size, shape, dimensions, length, width of the lane markings, presence or absence of lane marking, etc.), restricted parking times, required parking times of an operator of a vehicle, restricted travel times, restrictions based on how long parking is allowed (e.g., a maximum of 1 hour as compared to a need for 6 hours of parking), one or more road construction restrictions, parking facility or parking lot restrictions, emergency parking or handicap/special need restrictions, parking costs (e.g., metered parking per hour), and distance to and/or from a travel destination. The contextual factors component 440 may learn, identify, collect, analyze, evaluate, and/or determine each of the contextual factors positively and/or negatively affecting the user 402.

The machine learning component 460 may learn and build one or more models for intelligent dynamic parking and to also learn one or more variable costs (e.g., congestion costs, travel costs, parking costs, etc.) contextual factors, starting/ending locations, various transportation networks (e.g., graphs with one or more edges/nodes), one actions, and/or user preferences.

The machine learning component 460 may provide the NLP and AI services. These NLP and AI services may include, for example, IBM® Watson®, which may be provided as a cloud service or as a local service (IBM® and Watson® are trademarks of International Business Machines Corporation).

In one aspect, the machine learning component 460, as described herein, may be performed by a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Additionally, the computing system 12/computing environment 402 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
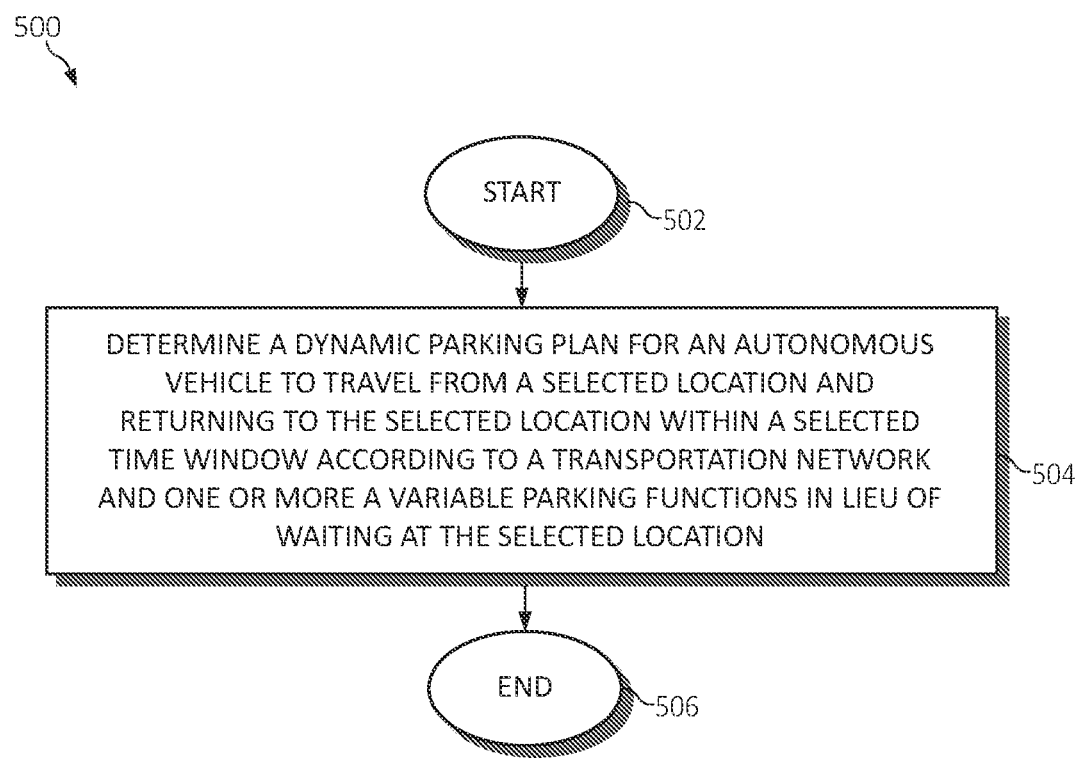
FIG. 5 is a flowchart diagram of an exemplary method for implementing dynamic parking for autonomous vehicles by a processor, in which various aspects of the present invention may be realized.

Turning now to FIG. 5, a method 500 for implementing intelligent dynamic parking for autonomous vehicles by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. The functionality 500 may start in block 502.

A dynamic parking plan may be determined for an autonomous vehicle to travel from a selected location and returning to the selected location within a selected time window according to a transportation network and one or more a variable parking functions in lieu of waiting at the selected location, as in block 504. The functionality 500 may end, as in block 506.

Figure 6:
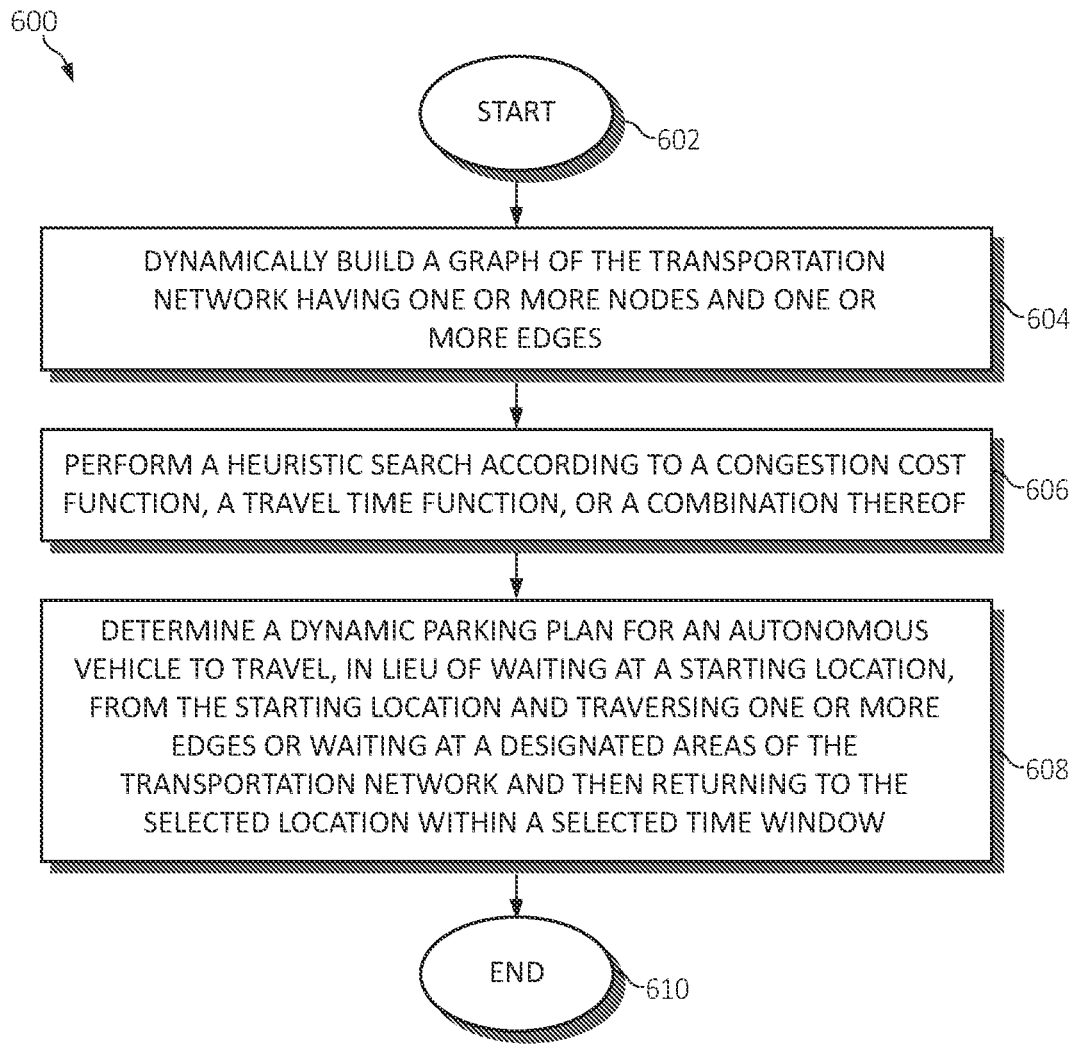
FIG. 6 is a flowchart diagram of an additional exemplary method implementing dynamic parking for autonomous vehicles by a processor, in which various aspects of the present invention may be realized.

Turning now to FIG. 6, a method 600 for implementing intelligent dynamic parking for autonomous vehicles by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A graph of a transportation network may be generated/built (and/or alternatively received) having one or more nodes and one or more edges, as in block 604. A heuristic search may be performed according to a congestion cost function, a travel time function, or a combination thereof, as in block 606. A dynamic parking plan may be determined for an autonomous vehicle to travel, in lieu of waiting at a starting location, from the starting location and traversing one or more edges or waiting at a designated areas of the transportation network and then returning to the selected location within a selected time window, as in block 608. The functionality 600 may end, as in block 610.

In one aspect, in conjunction with and/or as part of at least one block of FIGS. 5-6, the operations of methods 500 and/or 600 may include each of the following. The operations of methods 500 and/or 600 may determine one or more actions to perform within the dynamic plan, wherein the one or more actions include traversing one or more edges in a transportation network of the transportation network, waiting at selected alternative locations, or a combination thereof. The operations of methods 500 and/or 600 may define the one or more variable parking functions according to a congestion cost function that minimizes a total congestion cost (e.g., a total travel distance) by autonomous vehicle, and/or define the one or more a variable parking functions according to a travel time function that determines an amount of time for the autonomous vehicle to travel. The autonomous vehicle may be restricted to be within at least a defined amount of time from the selected location. The operations of methods 500 and/or 600 may dynamically adjust the dynamic parking plan according to one or more contextual factors. The operations of methods 500 and/or 600 may dynamically build a graph of the transportation network having one or more nodes and one or more edges, perform a heuristic search according to a congestion cost function, a travel time function, or a combination thereof, and/or traverse the one or more edges according to the heuristic search for traveling from the selected location and returning to the selected location.

The operations of methods 500 and/or 600 may provide, in a GUI of a computing system of a vehicle, a map of the dynamic plan whereby a user may dynamically interact with the GUI to update, alter, adjust, and/or override one or more actions or operations of the dynamic plan. The operations of methods 600 and/or 700 may also display, in real time in the GUI, each state change of the dynamic plan.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for dynamic parking for autonomous vehicles, comprising:

receiving input, by an autonomous vehicle, instructing the autonomous vehicle to travel from an initial location to a selected location, wherein the autonomous vehicle carries at least one passenger from the initial location to the selected location;

determining a dynamic parking plan for the autonomous vehicle to travel from the selected location at a first time and return to the selected location at a second time according to a transportation network and one or more variable parking functions, wherein the at least one passenger is unloaded at the selected location such that, subsequent to unloading the at least one passenger at the selected location at the first time, the autonomous vehicle autonomously travels from the selected location at the first time, on a determined route of a sequence of vehicle movements computed prior to departing the selected location at the first time, and back to the selected location at the second time in lieu of waiting at the selected location;

in conjunction with the determining of the dynamic parking plan according to the one or more variable parking functions, defining the one or more variable parking functions according to a congestion cost function that minimizes a total congestion cost by the autonomous vehicle, wherein the total congestion costs is a sum of a plurality of congestion costs respectively associated with each of a plurality of trip segments of the determined route;

determining, for the dynamic parking plan, a transition plan of one or more transitions equal to traversing one or more edges of the transportation network on the determined route according to a search space built containing all possible combinations of trip segments, including the plurality of trip segments, able to be used to return to the selected location at the second time, wherein the determined route is identified by relaxing an admissible estimation of an acceptable heuristic of the search space, and, commencing with the selected location, pruning those trip segments of all possible combinations of trips segments that do not comply with the acceptable heuristic as compared to the relaxed admissible estimation, wherein determining the transition plan for the dynamic parking plan includes causing the autonomous vehicle to perform one or more actions on the determined route, and wherein the one or more actions include traversing the one or more edges and waiting at one of the one or more transitions of one or more of the plurality of trip segments for one time step according to the congestion cost associated therewith and the total congestion cost.

2. The method of claim 1, further including determining one or more actions to perform within the dynamic plan, wherein the one or more actions include traversing the one or more edges of the transportation network, waiting at selected alternative locations, or a combination thereof.

3. The method of claim 1, further including defining the one or more variable parking functions according to a travel time function that determines an amount of time for the autonomous vehicle to travel.

4. The method of claim 1, further including restricting the autonomous vehicle to be within at least a defined amount of time from the selected location.

5. The method of claim 1, further including dynamically adjusting the dynamic parking plan according to one or more contextual factors.

6. The method of claim 1, further including:
dynamically building a graph of the transportation network having one or more nodes and the one or more edges;
performing a heuristic search according to a congestion cost function, a travel time function, or a combination thereof, and
traversing the one or more edges according to the heuristic search for traveling from the selected location and returning to the selected location.

7. A system for dynamic parking for autonomous vehicles, comprising:
one or more computers with executable instructions that when executed cause the system to:
receive input, by an autonomous vehicle, instructing the autonomous vehicle to travel from an initial location to a selected location, wherein the autonomous vehicle carries at least one passenger from the initial location to the selected location;
determine a dynamic parking plan for the autonomous vehicle to travel from the selected location at a first time and return to the selected location at a second time according to a transportation network and one or more variable parking functions, wherein the at least one passenger is unloaded at the selected location such that, subsequent to unloading the at least one passenger at the selected location at the first time, the autonomous vehicle autonomously travels from the selected location at the first time, on a determined route of a sequence of vehicle movements computed prior to departing the selected location at the first time, and back to the selected location at the second time in lieu of waiting at the selected location;
in conjunction with the determining of the dynamic parking plan according to the one or more variable parking functions, define the one or more variable parking functions according to a congestion cost function that minimizes a total congestion cost by the autonomous vehicle, wherein the total congestion costs is a sum of a plurality of congestion costs respectively associated with each of a plurality of trip segments of the determined route; and
determine, for the dynamic parking plan, a transition plan of one or more transitions equal to traversing one or more edges of the transportation network on the determined route according to a search space built containing all possible combinations of trip segments, including the plurality of trip segments, able to be used to return to the selected location at the second time, wherein the determined route is identified by relaxing an admissible estimation of an acceptable heuristic of the search space, and, commencing with the selected location, pruning those trip segments of all possible combinations of trips segments that do not comply with the acceptable heuristic as compared to the relaxed admissible estimation, wherein determining the transition plan for the dynamic parking plan includes causing the autonomous vehicle to perform one or more actions on the determined route, and wherein the one or more actions include traversing the one or more edges and waiting at one of the one or more transitions of one or more of the plurality of trip segments for one time step according to the congestion cost associated therewith and the total congestion cost.

8. The system of claim 7, wherein the executable instructions further determine one or more actions to perform within the dynamic plan, wherein the one or more actions include traversing the one or more edges of the transportation network, waiting at selected alternative locations, or a combination thereof.

9. The system of claim 7, wherein the executable instructions further define the one or more variable parking functions according to a travel time function that determines an amount of time for the autonomous vehicle to travel.

10. The system of claim 7, wherein the executable instructions further restrict the autonomous vehicle to be within at least a defined amount of time from the selected location.

11. The system of claim 7, wherein the executable instructions further dynamically adjust the dynamic parking plan according to one or more contextual factors.

12. The system of claim 7, wherein the executable instructions further:
dynamically build a graph of the transportation network having one or more nodes and the one or more edges;
perform a heuristic search according to a congestion cost function, a travel time function, or a combination thereof; and
traverse the one or more edges according to the heuristic search for traveling from the selected location and returning to the selected location.

13. A computer program product for dynamic parking for autonomous vehicles by a processor, the computer program product comprising a non-transitory computer-readable storage medium having computer-readable program code portions stored therein, the computer-readable program code portions comprising:

an executable portion that receives input, by an autonomous vehicle, instructing the autonomous vehicle to travel from an initial location to a selected location, wherein the autonomous vehicle carries at least one passenger from the initial location to the selected location;

an executable portion that determines a dynamic parking plan for the autonomous vehicle to travel from the selected location at a first time and return to the selected location at a second time according to a transportation network and one or more variable parking functions, wherein the at least one passenger is unloaded at the selected location such that, subsequent to unloading the at least one passenger at the selected location at the first time, the autonomous vehicle autonomously travels from the selected location at the first time, on a determined route of a sequence of vehicle movements computed prior to departing the selected location at the first time, and back to the selected location at the second time in lieu of waiting at the selected location;

an executable portion that, in conjunction with the determining of the dynamic parking plan according to the one or more variable parking functions, defines the one or more variable parking functions according to a congestion cost function that minimizes a total congestion cost by the autonomous vehicle, wherein the total congestion costs is a sum of a plurality of congestion costs respectively associated with each of a plurality of trip segments of the determined route; and an executable portion that determines, for the dynamic parking plan, a transition plan of one or more transitions equal to traversing one or more edges of the transportation network on the determined route according to a search space built containing all possible combinations of trip segments, including the plurality of trip segments, able to be used to return to the selected location at the second time, wherein the determined route is identified by relaxing an admissible estimation of an acceptable heuristic of the search space, and, commencing with the selected location, pruning those trip segments of all possible combinations of trips segments that do not comply with the acceptable heuristic as compared to the relaxed admissible estimation, wherein determining the transition plan for the dynamic parking plan includes causing the autonomous vehicle to perform one or more actions on the determined route, and wherein the one or more actions include traversing the one or more edges and waiting at one of the one or more transitions of one or more of the plurality of trip segments for one time step according to the congestion cost associated therewith and the total congestion cost.

14. The computer program product of claim 13, further including an executable portion that determines one or more actions to perform within the dynamic plan, wherein the one or more actions include traversing the one or more edges of the transportation network, waiting at selected alternative locations, or a combination thereof.

15. The computer program product of claim 13, further including an executable portion that defines the one or more variable parking functions according to a travel time function that determines an amount of time for the autonomous vehicle to travel.

16. The computer program product of claim 13, further including an executable portion that restricts the autonomous vehicle to be within at least a defined amount of time from the selected location.

17. The computer program product of claim 13, further including an executable portion that dynamically adjusts the dynamic parking plan according to one or more contextual factors.

18. The computer program product of claim 13, further including an executable portion that:
dynamically builds a graph of the transportation network having one or more nodes and the one or more edges;
performs a heuristic search according to a congestion cost function, a travel time function, or a combination thereof; and
traverses the one or more edges according to the heuristic search for traveling from the selected location and returning to the selected location.

* * * * *